Figure 1:
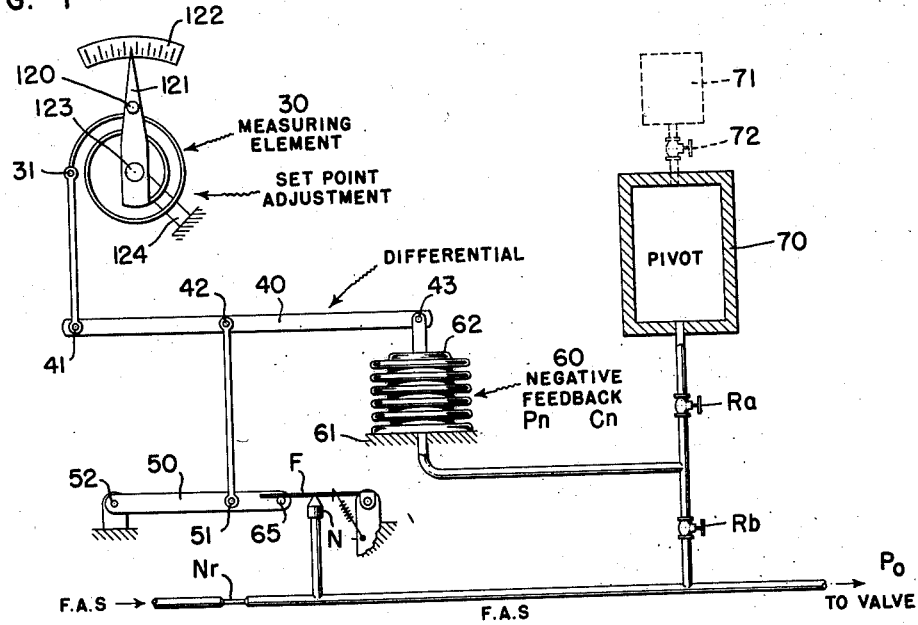

Dec. 1, 1959     T. R. HARRISON     2,915,079

AIR-PRESSURE-OPERATED PROPORTIONAL BAND ADJUSTMENT

Filed Nov. 19, 1952     11 Sheets-Sheet 1

INVENTOR.
THOMAS R. HARRISON

BY *Arthur H. Swanson*

ATTORNEY.

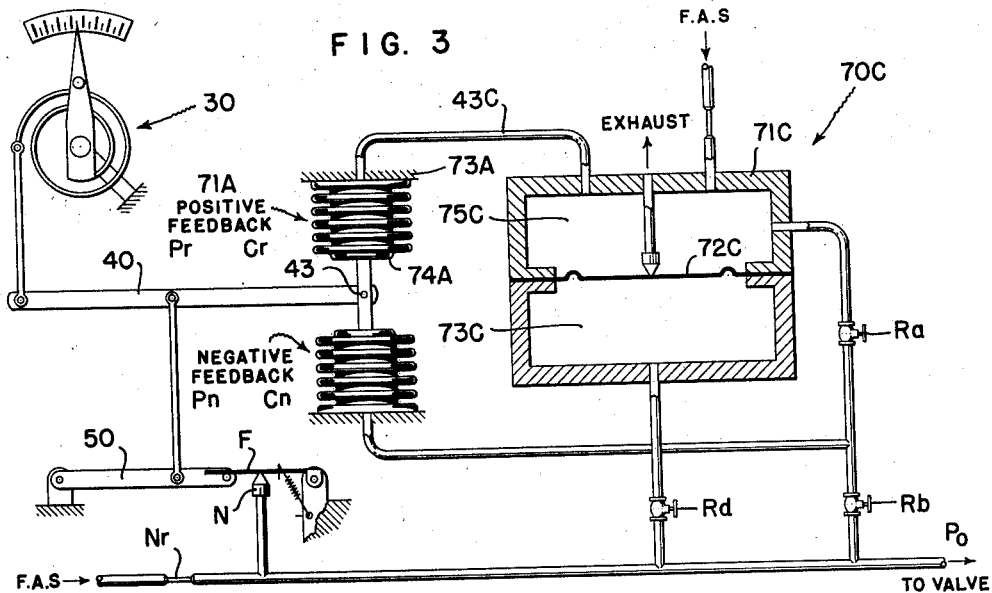
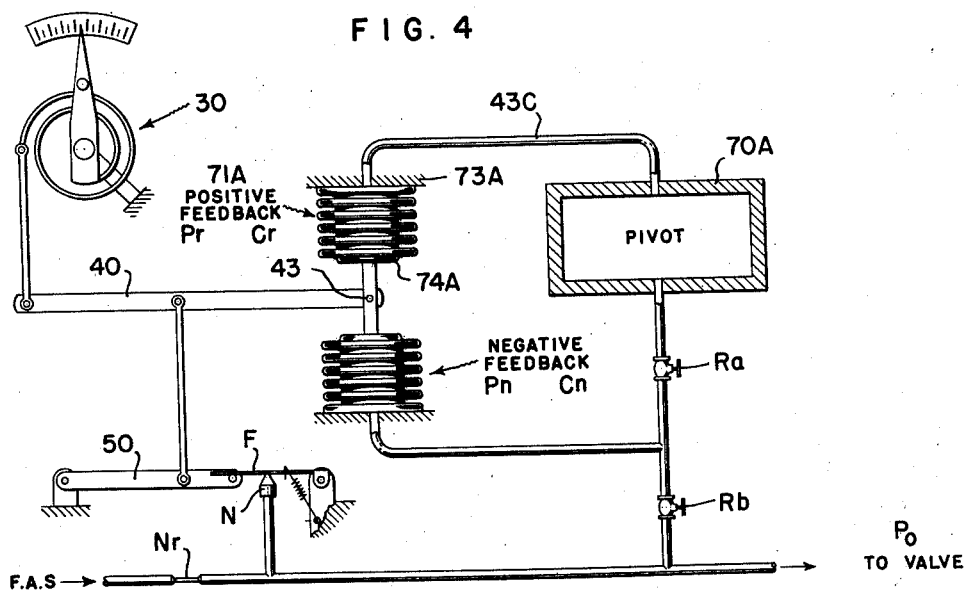

*INVENTOR.*
THOMAS R. HARRISON
ATTORNEY.

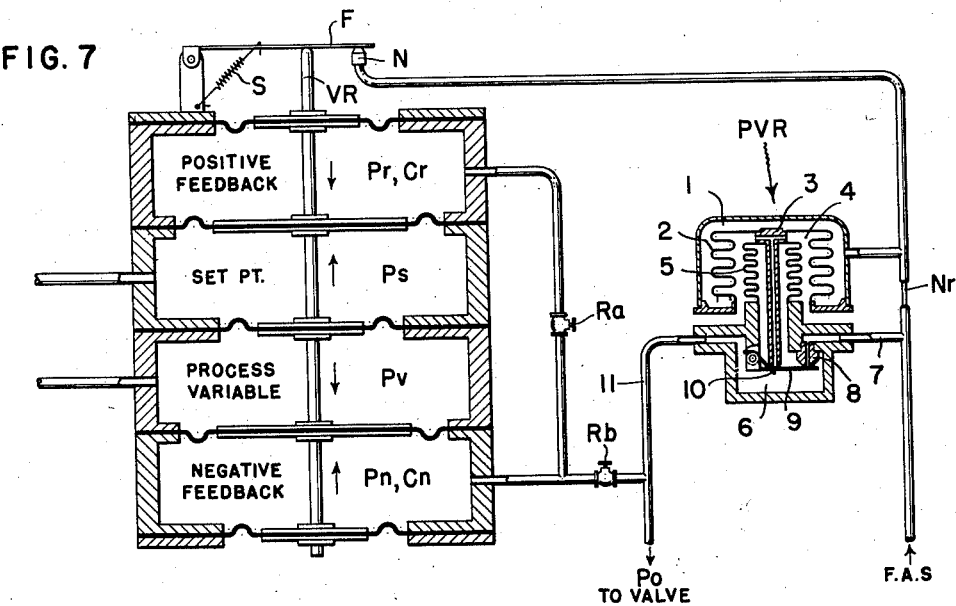
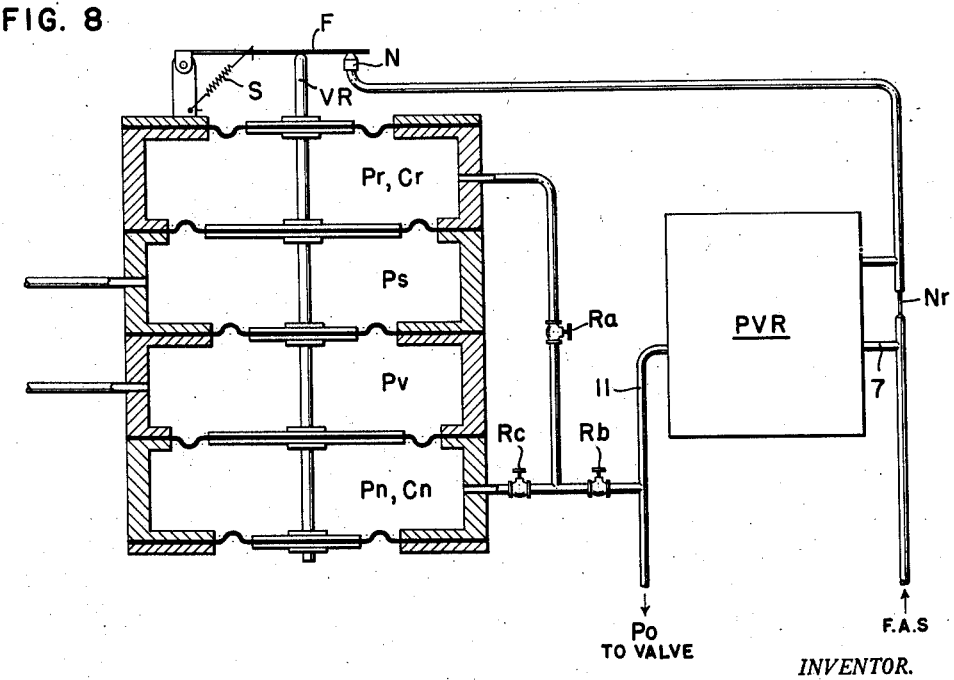

INVENTOR.
THOMAS R. HARRISON

ATTORNEY.

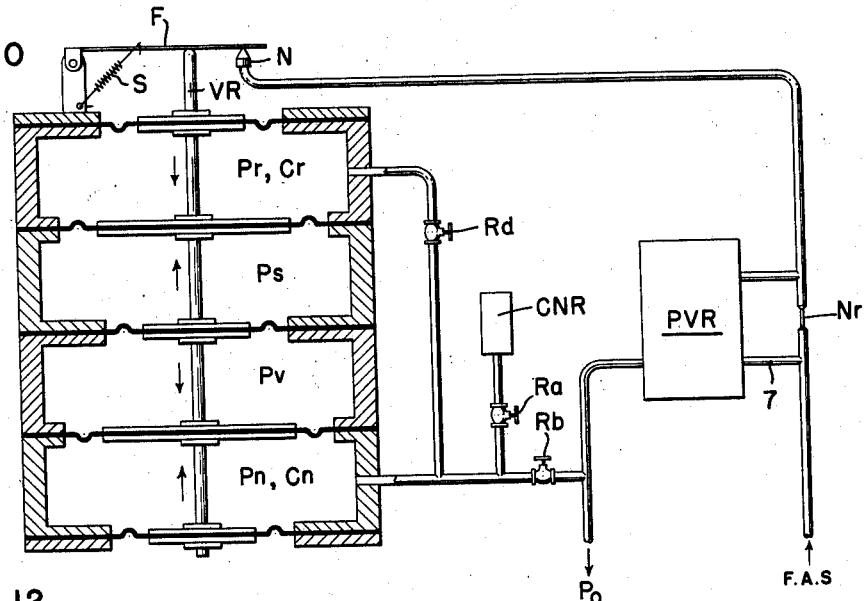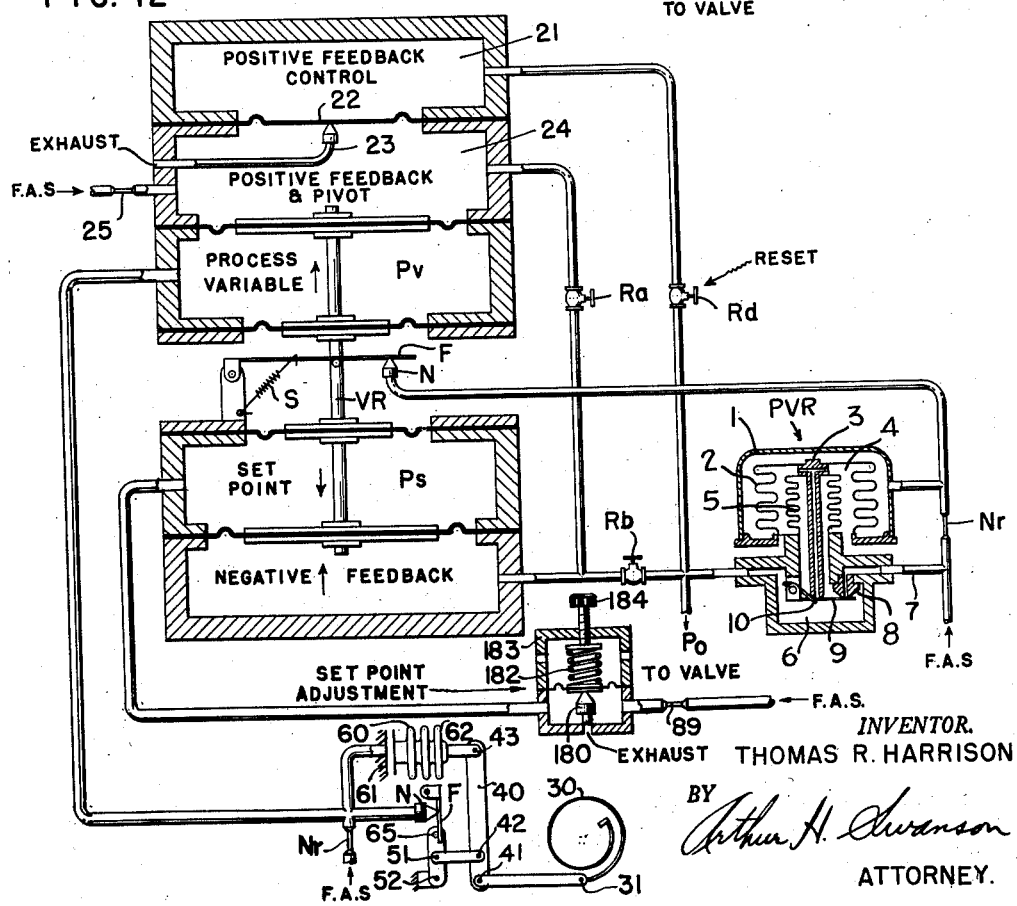

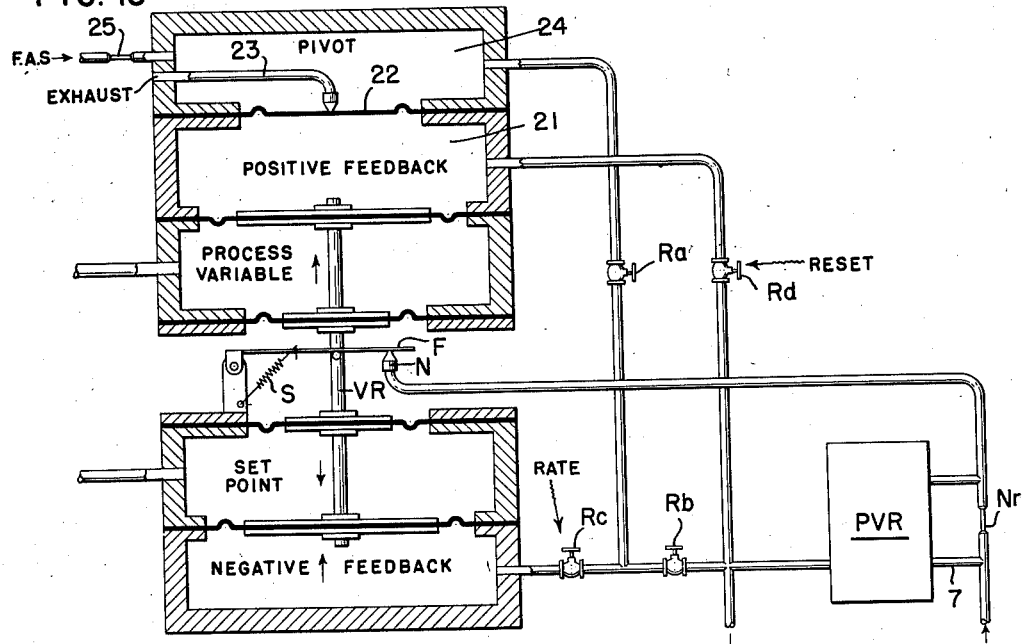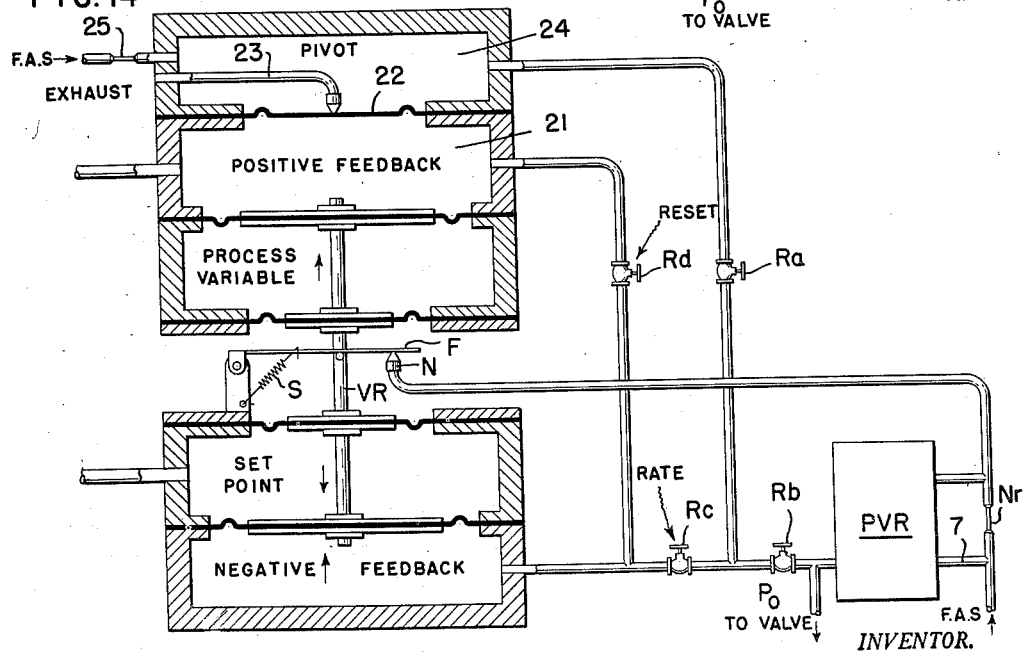

INVENTOR.
THOMAS R. HARRISON

Dec. 1, 1959 T. R. HARRISON 2,915,079
AIR-PRESSURE-OPERATED PROPORTIONAL BAND ADJUSTMENT
Filed Nov. 19, 1952 11 Sheets-Sheet 9

INVENTOR.
THOMAS R. HARRISON
BY
ATTORNEY.

Dec. 1, 1959 T. R. HARRISON 2,915,079
AIR-PRESSURE-OPERATED PROPORTIONAL BAND ADJUSTMENT
Filed Nov. 19, 1952 11 Sheets-Sheet 10

INVENTOR.
THOMAS R. HARRISON
BY Arthur H. Swanson
ATTORNEY.

Dec. 1, 1959  T. R. HARRISON  2,915,079
AIR-PRESSURE-OPERATED PROPORTIONAL BAND ADJUSTMENT
Filed Nov. 19, 1952  11 Sheets-Sheet 11

*INVENTOR.*
THOMAS R. HARRISON
BY
ATTORNEY.

United States Patent Office 2,915,079
Patented Dec. 1, 1959

2,915,079
AIR-PRESSURE-OPERATED PROPORTIONAL BAND ADJUSTMENT

Thomas R. Harrison, Wyncote, Pa., assignor to Minneapolis-Honeywell Regulator Company, Minneapolis, Minn., a corporation of Delaware Application November 19, 1952, Serial No. 321,436

13 Claims. (Cl. 137—86)

This invention relates to an industrial process controller operated by an elastic fluid, such as air. This controller has one or more of the following several different actions or modes of operation including: proportional-position action (alternately known as throttling action), proportional-speed floating action (also known as reset action), and rate action. This controller also has an adjustable proportional band (i.e., adjustable throttling range). These terms are defined in the publication Mechanical Engineering for February, 1946, republished by the American Society of Mechanical Engineers, 29 W. 39th Street, New York 18, New York in a pamphlet entitled "Automatic Control Terms." A copy of this pamphlet is in the United States Patent Office.

It is an object of this invention to provide improvements in a controller having one or more of the above mentioned modes of operation including means for adjusting each of these actions through the medium of adjusting a restriction to elastic fluid flow through a conduit which conducts a control-exercising elastic fluid.

A second object is to obtain adjustment of the throttling range by adjusting the ratio of the resistance of one restriction to another without upsetting the process under control. This adjustment is made by influencing a nozzle pressure in an elastic fluid under pressure in response to changes in a measured variable, conducting this fluid through a first restriction and a second restriction, one or more of said restrictions being adjustable, into a chamber containing a relatively invariable pivot pressure, and associating the pressure between the restrictions with a control exerting chamber (the negative feed-back chamber) that opposes the operations of the controller caused by the measured variable. The two restrictions provide an adjustable pressure divider adapted to vary the ratio between the changes occurring in the measured variable and the resulting changes produced in the nozzle pressure. This provides the desired throttling range adjustment. When the system is in stable equilibrium the nozzle pressure equals the pivot pressure, so that changes in the restriction adjustments do not then cause any change in the negative feed-back pressure and hence do not upset the process.

A third object of this invention is to provide a controller as set forth in the preceding paragraph in which the pivot pressure is associated with the operation of the controller to supply positive feedback or movement of the control-exercising means in the same direction as it is moved by the measured variable.

A fourth object of this invention is to provide a controller as set forth in the paragraph second preceding in which the pivot pressure is made to serve the function of the set point pressure of the controller instead of being associated with the positive feedback of the controller.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:
Each of the twenty-one figures labelled Figs. 1–21 is a schematic or diagrammatic representation of an elastic-fluid-operated controller and its cooperating valves and piping.

Each chamber is marked with the pressure it contains. These pressures include: Positive Feedback, Set Point, Process Variable, Negative Feedback, and Pivot. Each chamber is also identified with a symbol denoting the pressure in that chamber and/or a symbol denoting the capacity of that chamber. The symbols for pressure are: $P_r$, $P_s$, $P_v$, $P_n$, and $P_c$. The symbols for capacity are: $C_r$, $C_n$, and $C_c$. The arrows in each chamber denote the direction in which the pressure in that chamber acts.

In this specification and in the claims which form part thereof, the terms "input" and "output" and words of similar meaning are used in the sense that a signal originates in the process or measured variable, that this signal is sensed by the measuring element and is caused to initiate a succession of variations in the elastic fluid actuating the controller. Obviously this elastic fluid flows from the area at which the pressure is highest to the area at which the pressure is lowest. Regardless of this instantaneous direction of flow, an "input" side of a restriction, and the like, is to be understood to be the side connected to the area at which a variation in the pressure of the elastic fluid occurs earlier in the succession of events caused by the signal, and the output side is the opposite side.

*Discussion*

Controllers having positive and negative feedback fed from the output pressure of the controller tend to have the common defect that when the process variable remains too long above the set point continuously or too long continuously below it, the output pressure and the pressures in the positive and negative feedback chambers all tend to become equal to the maximum or minimum which can be supplied by action of the flapper-nozzle valve. The result is that the output pressure cannot be changed from this extreme value until the process variable returns to the set point. This causes undesired overshooting and consequent hunting.

The need for anti-hunting provisions in automatically operating and controlling apparatus has long been recognized and various methods have been proposed for counteracting the tendency to overshoot. One such prior art method for preventing hunting is disclosed in Reissue Patent 23,121, reissued to the applicant and to Walter P. Wills on June 14, 1949 for Measuring and Controlling Apparatus in which the rebalancing of a self-balancing electrical network is effected in accordance with the extent of unbalance thereof and suitable means are provided to maintain proportionality between the extent of unbalance and speed of rebalance. Specifically, in said prior patent, electrical resistive and capacitive components are connected in circuit between a variable voltage factor under measurement and the measuring apparatus to delay the complete application of the change in the said voltage to the measuring apparatus in accordance with the actuation of the rebalancing mechanism, thereby to accomplish the desired rebalancing operation in a minimum time without overshooting. The action of the resistive and capacitive components essentially is one which causes the measuring apparatus to initiate a rebalancing operation toward a point somewhat short of the actual point of rebalance. By suitably relating the resistive and capacitive component values to the inertia of the mechanically moving parts of the measuring apparatus, the location of the simulated or apparent point of rebalance with respect to the actual rebalance point may be such that the energization of the rebalancing apparatus is terminated and in some cases actually reversed prior to the attainment of the actual rebalance point. In this manner the speed of operation of the rebalancing apparatus in effecting rebalance may be extremely high without overshooting of the actual balance point taking place. As those skilled in the art will understand, the resistive and capacitive elements accomplish this desired action by effectively superimposing on the voltage value under measurement a voltage component varying in value in accordance with the rate of operation of the rebalancing apparatus. Considering the voltage value under measurement as an input signal, it may be said that the input signal applied to the measuring apparatus is modified by the algebraic addition of a rate component of voltage.

Figure 18:
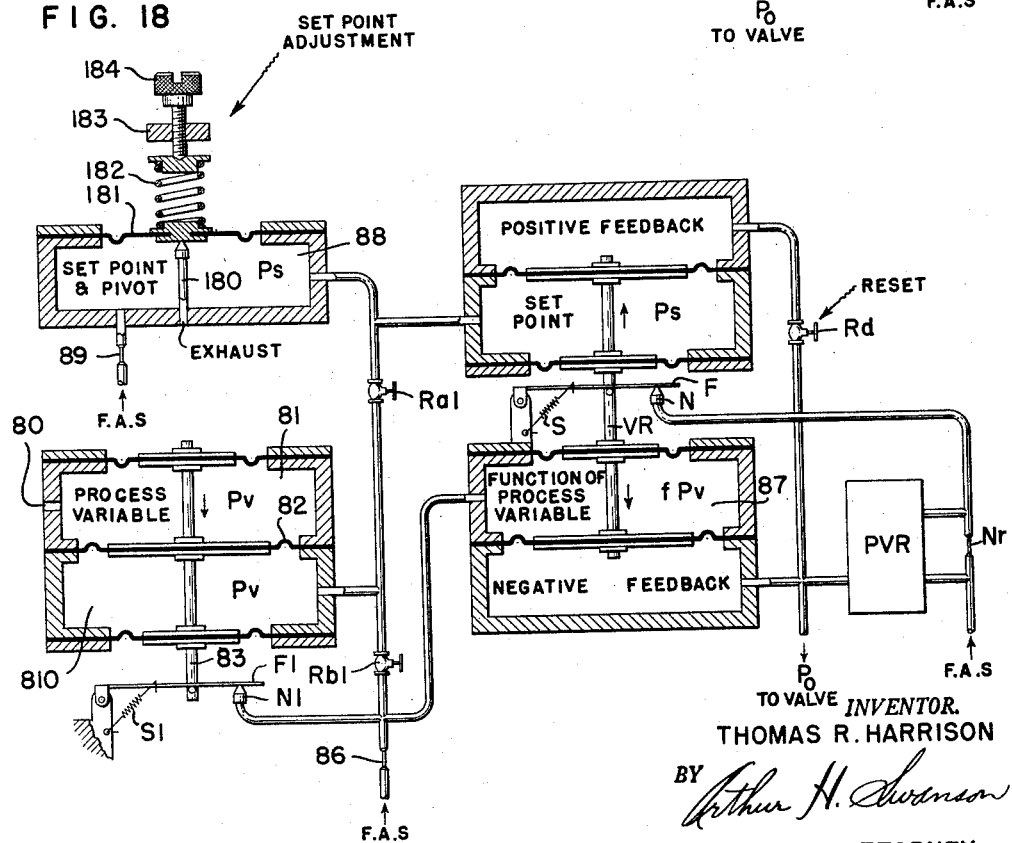

This principle of avoiding the tendency to overshooting in automatic rebalancing apparatus has also been proposed in the prior art in connection with the operation of elastic-fluid-operated controllers. Thus, it has been proposed to eliminate the tendency to overshoot by injecting into the chamber responsive to the process variable pressure, a pressure component representing rate of change of the process variable. By this means, the pressure within that chamber, being the algebraic sum of the process variable pressure and the rate component of pressure, will pass through the set point pressure value before the process variable pressure has reached the set point value. Consequently, an output pressure change is initiated suitably prior to the attainment of equality between the process variable and set point pressure to avoid the tendency to overshooting. A particular feature of the structure shown in Fig. 18 is that such a rate component is produced therein. This is accomplished in association with the arrangement disclosed for producing throttling range adjustment.

The controller of this invention, as is customary with controllers of this type, comprises: a set point adjustment; a measuring element, which senses variations in a measured variable; a control-exercising element, such as a cooperating flapper and nozzle valve, which is moved by said measuring element; a controller-per-se in which forces are applied to the control-exercising element to move it in the same direction as it is moved by the variations in the measured variable or in the opposite direction; and a final control element comprising a motor, and a valve operated by the motor.

This final control valve may be used in an "open-loop" controller to govern a quality or condition independent of the measured or process variable. Or the final control valve may form part of a controller operating in a "closed-loop" in which the final control valve supplies an agent to the process under control. The action of this agent is to correct the deviation of the controlled variable from its desired value. This valve and motor are well known and are therefore not illustrated herein.

The controllers here described fall into two general classes: force balance and space balance. Force balance controllers are those in which the force or pressure, which variations in the measured variable cause the measuring element to exert, is applied to the control-exercising element directly, and an opposing force, known as negative feedback or follow-up, directly opposes this force or pressure of the measuring element and restores the control-exercising element against the force of the measuring element. Such controllers are shown in Figs. 5–21 of the drawings. Space balance controllers are those in which the force or pressure due to the measuring element are applied to the control-exercising element through a differential linkage. The negative feedback or follow-up is applied to another input to the differential, so that the control-exercising element may be positioned either by the measuring element or by the follow-up, each independently of the other. This causes the control-exercising element to be restored to a fixed position and leaves the measuring element deflected.

*The set point adjustment*

The set point adjustment comprises manually operable means for determining or setting the desired base or datum for the measured variable. Variations or deviations of the measured variable from this datum or base are used to exercise control actions which cause the measured variable to return to the desired, set value, if the controller is operating in a "closed-loop." Such manually operable, set-point-adjustment means may comprise a knob for setting the measuring element relative to its base or for setting a flapper valve relative to a cooperating nozzle or may comprise manually operable means for selecting an air pressure which is applied to a chamber in the controller-per-se, herein called the set point pressure chamber, to exert on the control-exercising means a pressure ($Ps$) which opposes the force or pressure due to the measured variable. Such set point adjusting means are well known in the art. Any of these prior art devices may be used.

*The measuring element*

That variable of the process under control to which it is desired to have the controller respond is measured by a suitable measuring element. This measuring element notes the changes or deviations in the controlled or measured variable from the set value determined by the set point adjusting means. Such a variable may be: temperature, pressure or differential pressure, flow, specific gravity, density, strain, chemical concentration, humidity, weight, position, and/or variations therein or any other variable for which a suitable measuring element exists. The measuring element may apply a force to the control-exercising element or may convert the instantaneous value of the measured or process variable into a variable pressure ($Pv$). The pressure $Pv$ is fed to a chamber in the controller-per-se known as the process variable chamber and is applied to the control-exercising means in opposition to the set point pressure $Ps$.

*The control-exercising element*

This is shown as being constituted by a valve having a flapper or movable element F and a nozzle or stationary element N.

*The controller-per-se*

The controller-per-se is shown as comprising one or more motors which each applies a force to the flapper so as to move the flapper in the direction in which it has been moved by the measuring element or in the opposite direction.

In Fig. 7, for example, there are four of these forces which are constituted by elastic fluid pressures. One of these pressures is the process variable $Pv$, which is proportional to the deviation of the control variable from its set point. Pressure $Pv$ is applied to the third chamber of the controller-per-se. The chambers of the controller-per-se are numbered downward starting from the top of the sheet of drawing. The second of these pressures is the set point pressure $Ps$, representing that value of the control variable which it is desired to have the controller maintain. Pressure $Ps$ is applied to the second chamber of the controller-per-se. The third of these pressures is the follow-up or negative feedback $Pn$. This pressure acts in the opposite direction to the process variable. If the pressure $Pn$ is delayed in its application to the flapper F, a mode of operation known as rate action results. Pressure $Pn$ is applied to the fourth chamber of the controller-per-se. The fourth of these pressures is the positive feedback $Pr$. This pressure acts in the same direction as the process variable. If the pressure $Pr$ is delayed in its application to flapper F, a mode of operation known as reset results. Pressure Pr is applied to the first chamber of the controller-per-se.

Fig. 7 shows the controller arranged for direct action, that is to say, the negative feedback pressure opposes the process variable pressure and the positive feedback pressure opposes the set point pressure. If desired, the controller can be made to act in the reverse direction. One way in which this is done is reversing the second and third chambers so that the process variable pressure opposes the positive feedback pressure and the set point pressure opposes the negative feedback pressure.

When the controller is in the stable state, the resultant of the four abovementioned pressures on the flapper F equals zero and the controller tends to maintain the controlled variable at its set value.

Proportional band adjustment

The proportional band, which is also known as a throttling range, when applied to proportional-position controller action, is defined in the pamphlet "Automatic Control Terms" as the range of values of the controlled variable which corresponds to the full operating range of the final control element.

The proportional band adjustment means herein disclosed comprise an improvement on those shown in U.S. Patent 2,290,987 issued July 28, 1942, to C. B. Moore, assignor to the Brown Instrument Company, a predecessor of the assignee of this invention. The Moore patent discloses proportional band adjustment means comprising the valve member or flapper $d$, the relay chamber $H^3$ from which the output pressure is fed to a valve $Da$, which comprises an inlet to the negative feedback chamber $D'$, and an outlet or bleed to atmosphere. From the chamber $D'$ the negative feedback pressure is applied to the flapper $d$. The device of this patent is entirely satisfactory but since there is a continuous bleed to atmosphere, it is difficult, if not impossible, to adjust the throttling range or proportional band without causing an upset or "bump" in the process under control.

Throttling range and rate adjustment of this invention

The throttling range adjustment of this invention comprises an elastic fluid pressure controlled by the operation of the controller, a relatively unchangeable "pivot" pressure in a suitable chamber, two pressure dividing restrictions in a passage connecting the controlled fluid pressure to the pivot pressure chamber, and a negative feedback chamber connected to the point of junction between the two resistances. The controller is marked by the characteristic that the said controlled elastic fluid pressure and the pivot pressure tend to become equal when conditions of equilibrium exist.

Throttling range adjustment is accomplished by adjusting the ratio between the resistances of the two restrictions. If such adjustment is made when said pressures are equal, no pressure change is introduced by such adjustment, so that equilibrium is not upset thereby.

One of the novel features of this invention is that, since these restrictions are associated with the negative feedback chamber, the effect is to introduce a rate component into the controlled pressure of the elastic fluid. The time constant of this rate component is approximately the product of the volume of the negative feedback chamber and the parallel value of the resistances of the two restrictions. Means for providing additional rate response is disclosed in the following portions of this specification.

Pivot chamber

Four types of such a pivot chamber are disclosed in the various figures of the drawings.

(1) A closed chamber having inflexible walls. Such a chamber is shown in Fig. 1.

Figure 6:
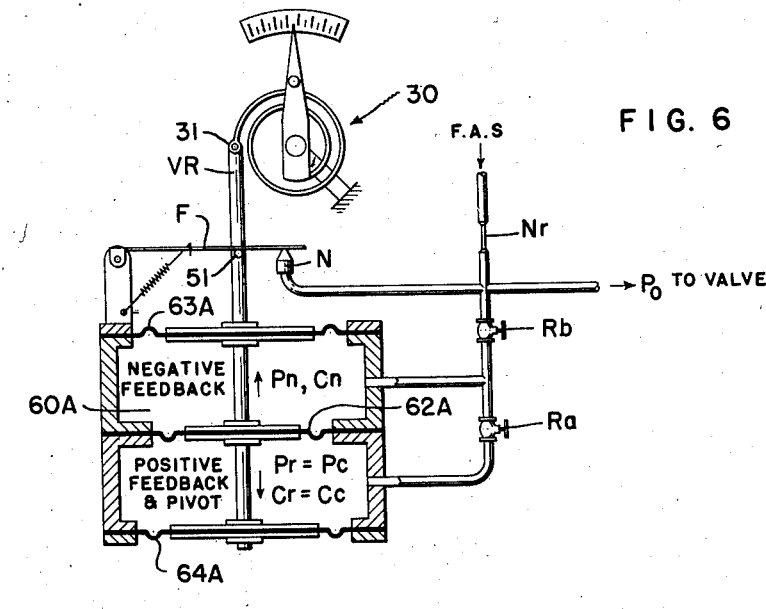

(2) A chamber having means for transmitting positive feedback to the control-exercising element. Such means include a flexible wall, which transmits the positive feedback pressure mechanically to the control-exercising element. Such a modification is shown in Figs. 4 and 6.

Figure 2:
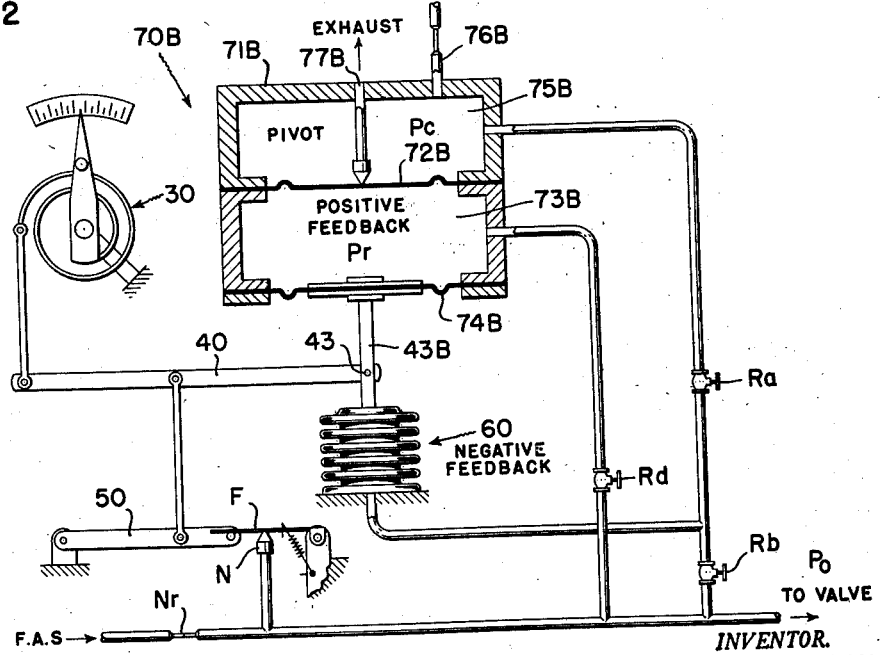

(3) A relay chamber having an additional supply and exhaust of elastic fluid in which the pivot pressure is controlled by another pressure, such as the positive feedback pressure Pr or the set point pressure Ps. Such modifications are shown in Figs. 2 and 18.

Restrictions

There are many well-known embodiments of the resistances Ra and Rb and of similar resistances Rc, Rd, Re, and Rm, mentioned hereinafter. These embodiments include: flow-controlling valves, of the needle valve or other types, which may be manually set to provide definite values of flow resistance, porous elements, coils, tubes, or capillaries of fixed construction. It is desirable that the values of resistance to flow presented by the valves Ra and Rb have a constant relationship to each other, except as intentionally changed. Therefore, the fluid passing through each of these valves should be at the same temperature as nearly as practical. For this reason, the valves Ra and Rb should be located close together. Either or both restrictions may be made adjustable manually, either by a handle or by means of a screw driver or other tool. Alternately, the restrictions may be fixed and of a suitable size to govern a particular process under control. Such fixed restrictions may be replaced by others when a different process is to be controlled.

Specific embodiments

Fig. 1 shows a space balance controller. It comprises a set point adjustment constituted by a handle 120 having operative engagement with the normally stationary end of the measuring element 30. The set point adjustment has a sliding fit or other locking means which permits the measuring element to be adjusted relative to a stationary post or support 124 by turning handle 120. The locking means fasten and hold the measuring means 30 in this adjusted position. So that this adjusted position may be known, handle 120 is mounted on a pointer 121 cooperating with a stationary scale 122.

The measuring element is shown as comprising a Bourdon or like tube 30 into the interior of which the measured variable in the form of a fluid pressure may be applied through the fixed end. Variations in the value of this measured variable cause the free end 31 of the measuring element 30 to move.

A differential comprises a floating lever 40 to one end 41 of which the free end 31 of the measuring element 30 is attached. From intermediate point 42 of the lever 40 a connection extends to a point 51 on a secondary lever 50, which lever is pivoted at 52 about a stationary pivot. The free end of the secondary lever 50 carries a pin 65 adapted to move the flapper F relative to the nozzle N. A source of elastic fluid leads from a supply, such as a filtered air supply F.A.S., through a nozzle restriction Nr to nozzle N. The pressure beyond the restriction Nr and within the nozzle N and the pipes connected thereto forms the output pressure $P_0$ which is applied to the final control element, comprising a fluid-operated diaphragm-motor and a valve controlled thereby. Such final control elements are well known and are therefore not illustrated herein.

To provide adjustment of the proportional band or throttling range, the output pressure $P_0$ is applied through a restriction Rb to a negative feedback chamber. This negative feedback chamber is shown as comprising a bellows 60 (or like elastic-fluid-pressure-operated motor) mounted on a stationary base or support 61. The movable portion or free end 62 of motor 60 is connected at 43 to another portion of the differential 40 and serves to operate the flapper F in the direction opposite to that in which the flapper is moved by the measuring element 30. The throttling range adjustment also includes a restriction Ra connected in series with the restriction Rb and in parallel with the negative feedback chamber 60 to a chamber 70 which has inflexible walls and which is closed to the atmosphere. The volumetric size or capacity of the negative feedback chamber 60 ($Cn$) and of the pivot chamber 70 are important. The capacity of chamber 70 may conveniently be ten times as large as that of chamber 60. The shape of the chamber 70 is not important. It may consist of one or more additional chambers 71 (shown dotted) connected thereto by one or more fixed adjustable restrictions 72 (shown dotted). The pressure $Pc$ in pivot chamber 70 is subject to variation and tends to become equal to the pressure at the input side of restriction $Rb$.

Fig. 2 shows a space balance controller having the same elements as that of Fig. 1 and to which the same reference characters have been applied. In addition, Fig. 2 shows a relay having a chamber 75B containing the pivot pressure $Pc$. This chamber is the fifth or pivot chamber. This relay is generally indicated by the reference character 70B and includes a rigid casing 71B having in it a flexible diaphragm or other movable part 72B forming one wall of a chamber 73B corresponding to the first chamber of Fig. 1. This is the positive feedback pressure chamber since it has a flexible diaphragm 74B connected to one end of a rod 43B attached at 43 so as to form one input to the differential comprised by floating lever 40. The output pressure $P_0$ from nozzle N is fed back through a fourth restriction $Rd$ to the positive feedback chamber 73B. Restriction $Rd$ may be manually adjusted so as to vary the amount of delay in the application of pressure to the positive feedback chamber 73B and thus to vary the amount of reset action.

Pressure $P_0$ is also fed through a restriction $Rb$ to a negative feedback chamber 60 and through restriction $Ra$ to the chamber 75B of relay 70B. Air is supplied to chamber 75B through an inlet connection 76B from a source of fluid F.A.S. Diaphragm 72B cooperates with the inner end of a tube 77B whose opposite end is open to the atmosphere so that tube 77B forms an exhaust. The pressure $Pr$ in chamber 73B causes positive feedback and controls the pressure in pivot chamber 75B. Chamber 75B has facilities for rapid supply and exhaust, hence the volume of the chamber is not involved in the determination of the pivot pressure.

Fig. 3 shows a space balance controller similar to that of Fig. 1 and in which the same reference characters have been applied to the same elements. In this controller, however, the relay, generally indicated at 70C, comprises a rigid casing 71C divided by diaphragm 72C into two chambers 75C and 73C. Diaphragm 74B of Fig. 2 is omitted. Instead, the positive feedback pressure is transmitted by means of a pipe 43C to a positive feedback motor 71A comprising a stationary support or base 73A and a free end or movable part 74A. Pipe 43C conducts the positive feedback pressure from the relay chamber 75C to the positive feed-back chamber 71A pneumatically instead of applying the positive feedback force mechanically as shown in Fig. 2.

Fig. 4 shows a space balance controller having the same elements as Fig. 1 and to which the same reference characters have been applied. In addition, the device of Fig. 4 shows that the pressure in the pivot pressure chamber 70A may be used to supply the positive feedback through conduit 43C. A bellows 71A (or like elastic-fluid-pressure-operated motor) mounted on a fixed support or base 73A and having a movable end 74A attached to some point on the differential 40, such as point 43, provides positive feedback. It is obvious that the chambers 70A and 71A could be combined into a single chamber if desired. Such a single chamber could be achieved by the omission of chamber 70A and the use of chamber 71A of suitable, large size.

Figure 5:
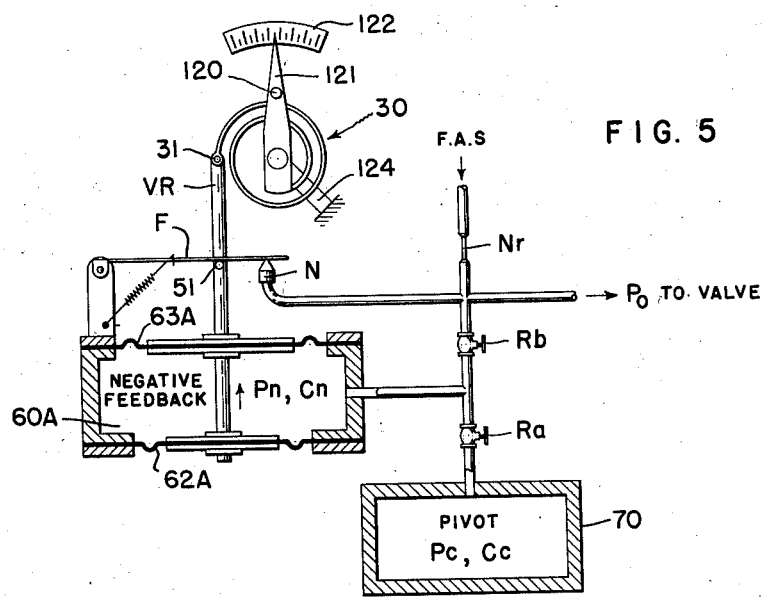

Fig. 5 and the remaining Figs. 6–21 of this application, show force balance controllers. The device of Fig. 5 has a set point adjustment including post 124, handle 120, pointer 121, and a scale 122, such as has been described when discussing Fig. 1. It also includes a measuring element, comprising a process-variable-responsive tube 30 having a movable end 31. In this modification, however, the differential 40 is omitted and the force developed at the movable end 31 of the measuring element 30 is applied to valve rod VR and is opposed by the negative feedback pressure on diaphragm 63A. The negative feedback may comprise: a chamber 60A having, at one end, a sealing diaphragm 62A; and, at the other end, a flexible, larger, operating diaphragm 63A. Each of diaphragms 62A and 63A is attached at its outer rim to the stationary parts of the case or chamber and at its central movable portion to an axially located valve rod VR. The upper end of valve rod VR is attached to the movable end of the measuring element 30. The operation of the valve rod VR in response to the pressure $Pn$ is to oppose the motion imparted by the movable end 31 of the measuring element 30 and, consequently, to move pin 51 and the flapper F toward the position which the measuring element and the flapper occupy when there has been no deviation of the measured variable from its set value. The device of Fig. 5 has a proportional-band-adjustment consisting of the restrictions $Rb$, $Ra$, and a closed chamber 70 for pivot pressure, similar to the description of Fig. 1.

Fig. 6 shows a controller similar to that shown in Fig. 5 and having the same parts to which the same reference characters have been applied. In addition, Fig. 6 shows that the closed chamber of the proportional-band-adjustment may be used to provide the positive feedback in a similar manner to that shown in Fig. 3. In order to do this, an additional chamber is applied to the feedback motor. This additional chamber has an additional, large, flexible diaphragm 64A connected at its central, movable portion to valve rod VR in such a way that the force exerted on the valve rod VR by the diaphragm 64A opposes the force imposed on the valve rod VR by the diaphragm 63A. Diaphragm 63A therefore gives negative feedback while diaphragm 64A gives positive feedback.

When the volume $Cn$ of the negative feedback chamber is relatively small with respect to the volume $Cc$ of the pivot chamber (including that of an extra volume chamber, as shown in Fig. 1, if necessary), a change in pressure $Pn$ can be made to be produced by a relatively larger change in the pressure $P_0$ resulting from the pressure-dividing action of the two restrictions $Ra$ and $Rb$. The degree to which change in $P_0$ is larger than $Pn$ is adjustable by varying the relative resistances of restrictions $Ra$ and $Rb$. Adjusting the ratio of $Ra$ to $Rb$ thus provides the desired adjustability of the proportional band action. A ratio of $Cn$ to $Cc$ of about one to ten is suitable for proportional band adjustment.

Since these restrictions are associated with the negative feedback chamber, the effect of volume of the negative feedback chamber is to introduce a rate component into the controlled pressure of the elastic fluid where the time constant of the rate component is approximately the product of the volume of the negative feed-back chamber and the parallel resistance value of the two restrictions.

This effect, whereby the resistances of these two restrictions introduces a rate component as one of the modes of operation of the controller, constitutes one of the novel features of this invention.

Rate adjustment is varied by adjusting the parallel resistance value $$\frac{RaRb}{Ra+Rb}$$

of the two restrictions. The rate of the proportional-speed floating action is dependent principally upon the volume $Cr$ and the sum $Ra+Rb$ of the resistances of the restrictions, so that by adjustment of the sum of the resistances R*a* and R*b* the desired adjustment can be effected in the proportional-speed floating action.

In Fig. 7 there is shown an elastic-fluid-pressure-operated, industrial process controller in which a variable herein variously referred to as a measured, process, or control variable, which has been converted to an air pressure P*v*, is opposed to an air pressure P*s*, which may be manually selected so as to be representative of the set point or that value of the control variable which the controller acts to maintain. See above under the headings The Measuring Element and The Controller-Per-Se. Any deviation of the process variable from its set value causes these air pressures P*s* and P*v* to differ. This actuates a valve, comprising a flapper F and a nozzle N, which controls a supply of air under pressure from a source of filtered air supply F.A.S. This controlled air pressure $P_0$ is fed to a final control element, such as an air-operated diaphragm motor governing a final control valve.

The supply air from the source F.A.S. passes through a restriction N*r* to the nozzle N and also passes to the motor chamber 1 of a pilot valve relay, generally designated PVR. Motor chamber 1 has, as a wall thereof, a flexible bellows 2 connected at its central, top portion to a T-shaped, perforated, exhaust port 3 which leads to the space 4 between bellows 2 and a concentric, smaller, sealing bellows 5. Bellows 5 is also sealed to the T-shaped, exhaust port 3 and forms a movable wall of a valve chamber, generally designated 6. The T-shaped, exhaust port 3 leads from the interior of chamber 6 to the atmosphere between the bellows 2 and 5. A pipe 7 leads a supply of air from source F.A.S. to a nozzle 8 with which cooperates a flapper 9 biased by a spring 10 against nozzle 8 and the foot or lower end of T-shaped, exhaust port 3. An outlet pipe 11 leads the controlled air pressure $P_0$ from chamber 6 to an air-operated motor (not shown), such as diaphragm motor, which operates a final control element, such as a valve (not shown).

The throttling-range-adjustment comprises restrictions R*b* and R*a*. The input side of restriction R*b* is connected to the pressure $P_0$. The output side of restriction R*b* is connected to the fourth or negative feedback chamber and also to the input side of restriction R*a*. The output side of restriction R*a* is connected to the first or positive feedback chamber which, in this embodiment, also forms the fifth or pivot pressure chamber.

Fig. 8 shows a modification which is very similar to Fig. 7. The same members have been given the same reference characters. The modification of Fig. 8 adds to the modification of Fig. 7 a restriction R*c*, which is interposed between the restriction R*b* and the fourth or negative feedback chamber containing the pressure P*n*. Restriction R*c* is adjustable to give extra rate action to the controller.

Figure 9:
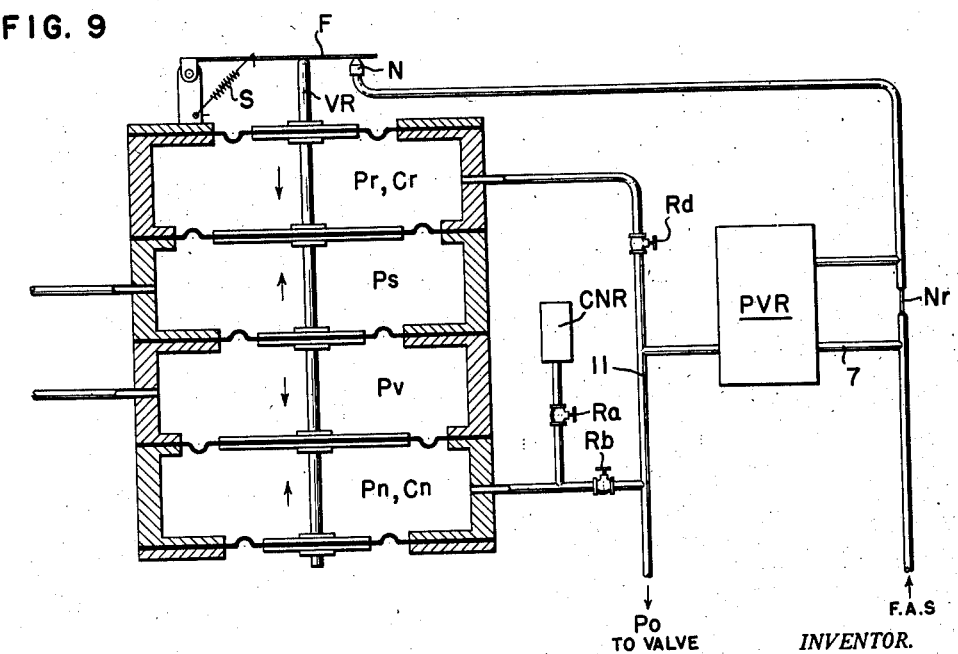

Fig. 9 shows a controller in which the output pressure $P_0$, coming either directly from the nozzle N or, as shown, from the pilot valve relay PVR, is applied to the final control valve (not shown) and through the restriction R*b* to the negative feedback chamber containing the pressure P*n*. The pressure P*n* is also applied through restriction R*a* to a closed chamber CNR which contains the pivot pressure. The ratio of the volume of the negative feedback chamber (C*n*) to the volume of the control pressure chamber CNR (C*c*) may suitably be one to ten. The pressure $P_0$ is also applied to the first or positive feedback pressure chamber containing the pressure P*r* through a restriction R*d*, which gives a reset component to the pressure P*r*.

Fig. 10 shows a modification which is very similar to Fig. 9. The same members have been given the same reference characters. The modification of Fig. 10 differs from that of Fig. 9, by the transposition of the connection containing the restriction R*d* from the input side of the restriction R*b* to the output side. Thus, Fig. 10 shows the fourth or negative feedback pressure chamber containing the pressure $P^n$ connected by a conduit containing a restriction R*d* to the first chamber containing the positive feedback pressure P*r*.

Figure 11:
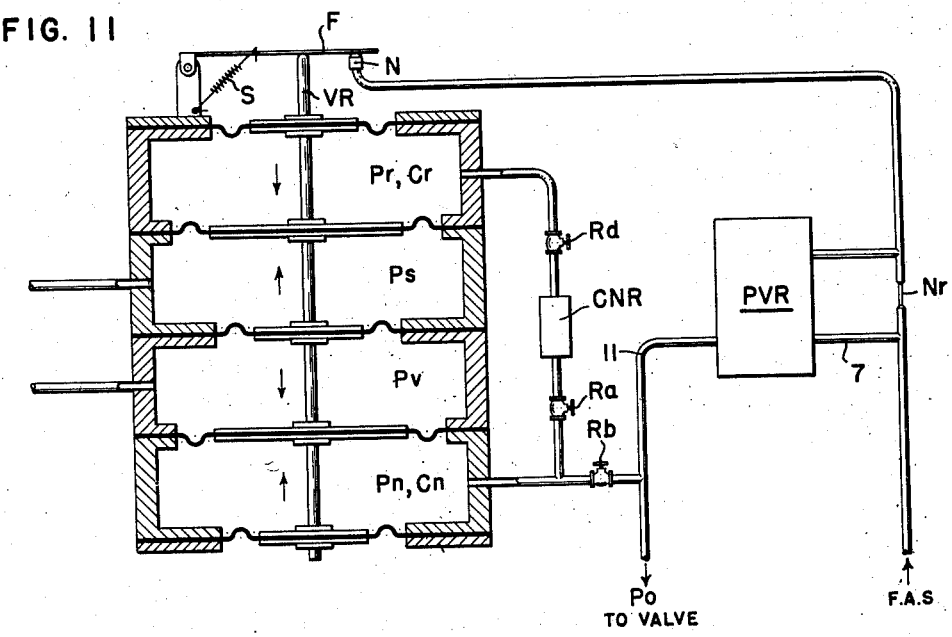

Fig. 11 shows a modification which is very similar to Fig. 4. The same members have been given the same reference characters. The modification of Fig. 11 differs from that of Fig. 4 in that there is interposed between the restrictions R*a* and the positive feedback chamber, a chamber CNR of larger capacity than the cross section of the pipe, and a fourth restriction R*d*. Restrictions R*a* and R*d* and chamber CNR provide more accurate and easily made adjustments of the proportional band and reset rate.

In Fig. 12 there is shown an elastic-fluid-pressure-operated, industrial process controller in which a variable (here in variously referred to as a measured, process, or control variable) which has been converted to an air pressure P*v*, is opposed to an air pressure P*s*, which may be manually selected so as to be representative of the set point or that value of the control variable which the controller acts to maintain. Any deviation of the process variable from its set value causes these air pressures P*v* and P*s* to differ. This actuates a valve, comprising a flapper F and a nozzle N, which controls a supply of air under pressure from a filtered air supply F.A.S. This controlled air pressure $P_0$ is fed to a final control element, such as an air-operated diaphragm motor governing a final control valve.

The means for converting the variable into an air pressure P*v* are comprised as follows. The measuring element 30 is shown as comprising a Bourdon or like tube. The free end 31 of the measuring element 30 is connected to one end of a floating lever which has pivotal engagement at the opposite end 41 with one end of a differential lever 40. From an intermediate point 42 of the differential lever 40, a connection extends to a point 51 on a secondary lever 50, which lever is pivoted upon a stationary pivot 52. The free end of secondary lever 50 carries a pin 65 which moves a flapper F relative to a nozzle N. A source of elastic fluid leads from a supply, such as a filtered air supply F.A.S., through a nozzle restriction N*r* to a nozzle N. The pressure beyond the restriction N*r* and within the nozzle N and the pipes connected thereto forms a process variable pressure P*v*. This process variable pressure is also applied to a bellows 60, or like elastic-fluid-pressure-operated motor, mounted on a stationary base or support 61. The movable portion or free end 62 of motor 60 is connected to another portion 43 of the differential lever 40 and serves to move the flapper F in a direction opposite to that which the flapper F is moved by the measuring element 30.

The means for manually selecting the set point pressure P*s* comprise a source F.A.S. of filtered, compressed air. A restriction 89 leads to a chamber in a rigid case 183. A flexible diaphragm forms a wall thereof. A spring 182 stresses this diaphragm against the pressure of the air in the chamber and toward a nozzle 180 which exhausts to atmosphere and which is normally covered. Case 183 supports a manually adjustable screw 184 which bears on the upper end of spring 182 and provides means to adjust the force of spring 182 and thus to vary the pressure of the air in the chamber which becomes the set point pressure P*s*.

Fig. 12 shows a controller in which the proportional band adjustment includes a relay similar to that shown in Fig. 2. This relay has a chamber 24 normally closed to atmospheric pressure but containing a source of fluid supply and an exhaust, this exhaust being under the control of the positive feedback control pressure in chamber 21. The output pressure $P_0$ of the pilot valve or relay PVR is fed to the final control element or valve (not shown). The output pressure $P_0$ is also fed through restriction R*d* to a positive feedback control pressure chamber 21. This chamber is always closed to atmosphere.

Fluid from a source of fluid supply F.A.S. is fed through an input restriction 25 to the positive feedback and pivot chamber 24. This chamber also contains an exhaust nozzle 23. Nozzle 23 is normally partially closed by a diaphragm 22 which forms a movable wall between the positive feedback pressure chamber 24 and the positive feedback control pressure chamber 21. Output pressure $P_0$ is fed through restrictions R$b$ and R$a$ in series to positive feedback chamber 24. The pressure in chamber 24 also serves as pivot pressure.

Fig. 13 shows a controller similar to that of Fig. 12 and in which the chambers 24 and 21 have been reversed and in which a rate restriction R$c$ has been added. The same members have been given the same reference characters. The output pressure $P_0$, either directly from nozzle N, or, as shown, from pilot valve relay PVR, is fed through restriction R$b$ and a rate restriction R$c$ to the fourth or negative feedback pressure chamber. The output of restriction R$b$ and the input of restriction R$c$ are connected to restriction R$a$ whose output is connected to the chamber 24 containing a pivot pressure. Elastic fluid can escape from chamber 24 through an exhaust nozzle 23. Elastic fluid from a source of filtered air supply F.A.S. is supplied through a restriction 25 to the chamber 24, which contains the pivot pressure. The output pressure $P_0$ is also fed to chamber 21 through a reset rate restriction R$d$. Chamber 21 is the first or positive feedback pressure chamber. The pressure in chamber 21 controls the pressure in chamber 24 by controlling the escape of fluid from chamber 24 through nozzle 23.

Fig. 14 shows a controller similar to that of Fig. 13. The same members have been given the same reference characters. In Fig. 14, however, the reset restriction R$d$ is connected between the fourth or negative feedback chamber and the first or positive feedback pressure chamber 21. The reset restriction R$d$ is connected at a point located between the rate restriction R$c$ and the first or positive feedback chamber.

Figure 15:
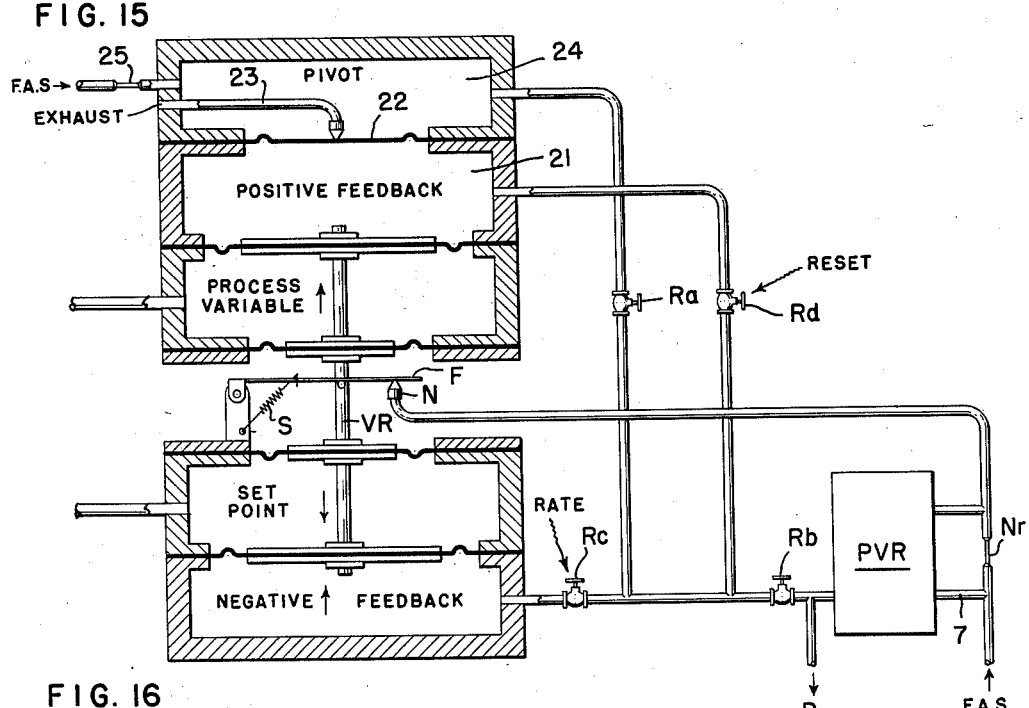

Fig. 15 shows a controller similar to that of Fig. 14. The same members have been given the same reference characters. The input of the reset restriction R$d$, however, is connected to the output of restriction R$b$ and to the input of restrictions R$c$ and R$a$. The output of restriction R$d$ is connected to the chamber 21 which contains the positive feedback pressure.

Figure 16:
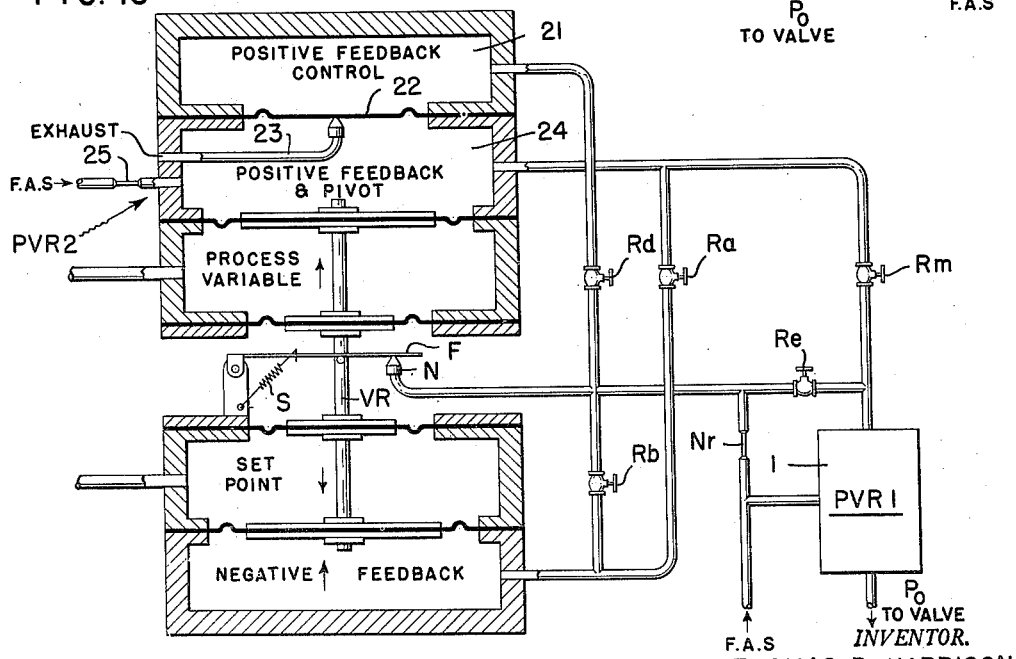

Fig. 16 shows a controller in which the output pressure $P_0$ to the final control element (not shown) is used neither for the negative feedback nor for the positive feedback. Instead, the nozzle pressure from nozzle N is employed for negative and positive feedback. The pressure from nozzle N is fed in three directions. First, through restriction R$b$ to the fourth or negative feedback chamber and thence through restriction R$a$ to the positive feedback and pivot chamber 24. Second, through the restriction R$d$ to the chamber 21 containing the positive feedback control pressure. Third, through the restriction R$e$ to the motor chamber 1 of a pilot valve or relay PVR1 similar in all respects to the pilot valve or relay PVR shown in detail in Fig. 7. The output of restriction R$e$ and of the motor chamber 1 is also connected through restriction R$m$ to the positive feedback and pivot chamber 24. The chambers 21 and 24 form part of a pilot valve or relay PVR2 having a supply of elastic fluid through restriction 25 and having an exhaust nozzle 23 controlled by diaphragm 22 which is subject, on its opposite faces, to the positive feedback control pressure in chamber 21 and to the positive feedback and pivot pressures in chamber 24.

Figure 17:
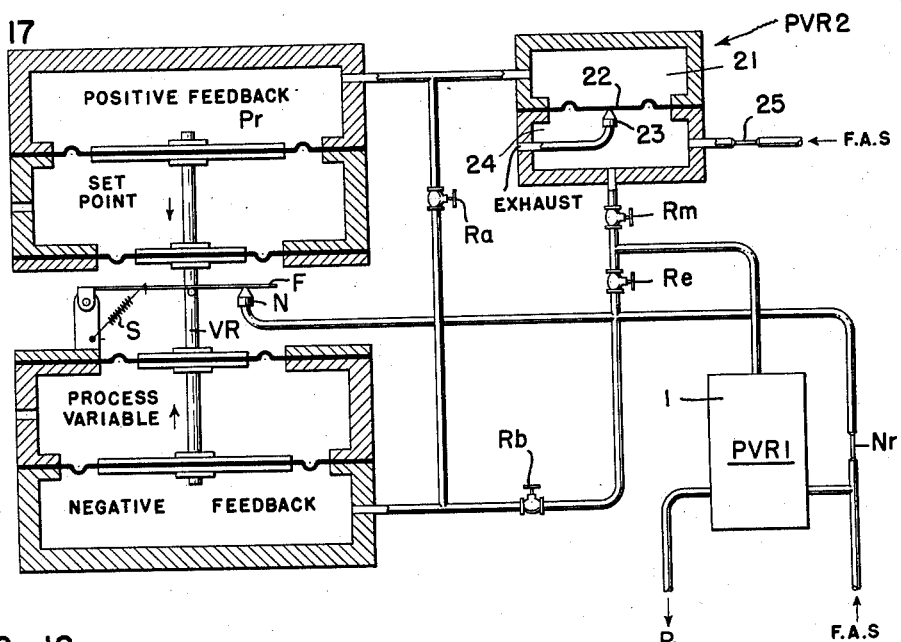

Fig. 17 also shows a controller in which two relays are employed. In this modification (Fig. 17), a valve rod VR operates the flapper F relative to the nozzle N so as to control the supply of air from the source F.A.S. through a restriction N$r$. This nozzle air pressure is fed directly through a restriction R$b$ to the fourth or negative feedback chamber and, through restrictions R$b$ and R$a$ in series, to the first or positive feedback chamber and to the motor chamber 21 of a second relay, generally indicated at PVR2. The motor chamber 21 has a diaphragm 22 which cooperates with an exhaust nozzle 23 to control the air pressure in a chamber 24, which is supplied from a source of filtered air supply F.A.S. through a restriction 25. The pressure from nozzle N is also fed through a restriction R$e$ to the motor chamber 1 of a pilot valve relay PVR1. The output pressure $P_0$ of the pilot valve relay PVR1 is fed directly to the final control valve and is not fed back to the controller. A fifth restriction R$m$ is connected at one end to restriction R$e$ and to the motor chamber 1 of relay PVR1 and is connected at its opposite end to chamber 24 of relay PVR2.

The pivot pressure in the modification of Fig. 18 is distinguished from the pivot pressure in the modifications of Figs. 1–17 because the pivot pressure of Fig. 18 is constant. The modification of Fig. 18 further distinguishes from the preceding modifications by containing the above-mentioned rate component in the pressure that is produced at the nozzle N1 and transmitted to chamber 87.

In the relay of this modification (Fig. 18), the process variable, in the form of an air pressure P$v$, is fed through an inlet 80 to a process variable chamber 81. Pressure P$v$ acts on diaphragm 82 so as to move valve rod 83 and to move flapper F1 relative to nozzle N1 and thus vary the pressure of the air which is supplied from source F.A.S. through restriction 86. Proportional band adjustment consists of adjusting the ratio of the resistances of restrictions R$b$1 and R$a$1. A restriction R$b$1 is connected on its input side to nozzle N1 and to a chamber 87 forming part of a four-chambered stack similar to those already described. The output of restriction R$b$1 is connected to chamber 810 and to the input of restriction R$a$1 whose output is connected to the set point chamber 88, which thus also becomes the pivot pressure chamber, and to the set point chamber of the four-chambered stack.

Variations in the process variable pressure P$v$ in chamber 81 tend to move valve rod 83 and flapper F1 so that the pressure of the elastic fluid in nozzle N1 varies and the elastic fluid flows through restriction R$b$1 to chamber 810 and through restriction R$a$1 to pivot pressure chamber 88 and to the set point pressure chamber.

The pressure in chamber 810 is made equal to the process variable pressure P$v$ and can be identified by the same reference character P$v$. The pressure in chamber 810 opposes the process variable pressure P$v$ in chamber 81. Therefore, the pressure in chamber 810 is a negative feedback pressure. The combined actions of the pressures on the two sides of the diaphragm 82 cause valve rod 83 to move flapper F1 with respect to nozzle N1 in such a manner as to produce a nozzle pressure $fPv$ that varies in magnified proportion to variations in the process variable pressure P$v$ according to the ratio of resistances R$b$1 and R$a$1. Adjustment of this ratio produces the variable throttling range.

As explained above under the heading Throttling Range and Rate Adjustment of This Invention, the pressure in nozzle N1 contains a component proportional to the rate of change of the process variable in addition to the magnification associated with the throttling range adjustment.

Fluid from source F.A.S. is supplied through restriction 89 to chamber 88 which also contains an exhaust valve 180 governed by a diaphragm 181. A spring 182 stresses diaphragm 181 against the pressure in chamber 88. A stationary support 183 supports a manually adjustable screw 184 which bears on the upper end of spring 182. The pressure of spring 182 can thus be adjusted to vary the pressure in chamber 88, which thus becomes the set point pressure P$s$. This set point pressure is fed to the set point chamber of the four-chambered stack so that it acts on the valve rod VR.

Pressure $fPv$ from nozzle N1 is fed to chamber 87 of the four-chambered stack where it acts as the input or process variable pressure. As such input or process variable pressure, pressure $fPv$ controls the action of flapper F relative to nozzle N and thus the pressure of the output pressure $P_0$. The output pressure $P_0$ may be that of nozzle N or, as shown, the output pressure from pilot valve relay PVR. Output pressure $P_0$ is fed to the final control valve (not shown), is also fed to the negative feedback chamber of the four-chambered stack, and, through reset restriction $Rd$, to the positive feedback chamber of the four-chambered stack.

Thus the initial effect of a change in the process variable pressure $Pv$ is to produce a magnified change in the negative feedback chamber of the four-chambered stack. In producing this change the pressure in nozzle N has undergone a change similar to the change undergone by pressure $fPv$ but has imposed these changes upon output pressure $P_0$. As stated above under Discussion, when time elapses, output pressure $P_0$ tends to approach input pressure $fPv$. Simultaneously, flow through restriction $Rd$ causes the pressure within the positive feedback chamber to approach the pressure in the negative feedback chamber thus causing pressure $P_0$ to tend further away from input pressure $fPv$ and toward either pressure F.A.S. or atmospheric pressure depending upon the direction of departure of the process variable pressure from the set point pressure. With long continued departure of the pressure $Pv$ from pressure $Ps$, as might exist in starting up a process and bringing it up to a desired set point, $P_0$ can in fact reach its maximum or minimum limit by the series of actions here described.

Under these conditions the usual prior art controller would be incapable of causing the output pressure $P_0$ to change from such an extreme value until the process variable pressure returns to the set point. This causes undesired overshooting and consequent hunting.

The presence of the rate component in the pressure $fPv$ supplied to the chamber 87 will cause pressure $fPv$ to pass through the set point pressure value before the process variable pressure has reached the set point pressure value. Consequently the output pressure begins changing from the above mentioned extreme value suitably prior to the attainment of equality between the process variable and the set point pressure to avoid the tendency to overshooting.

The presence of the rate component in the pressure $fPv$ supplied to chamber 87 is transmitted to the output pressure $P_0$ to constitute rate response of the controller-per-se. This rate component has a further advantageous function.

Figure 19:
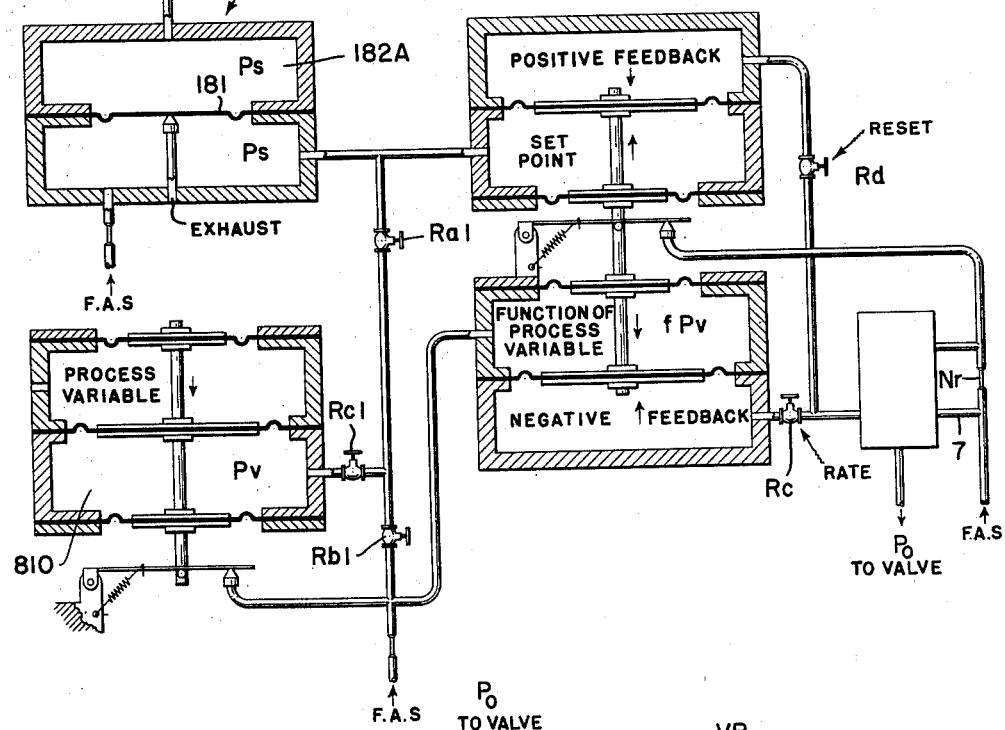

Fig. 19 shows a controller similar to that of Fig. 18. The same elements have been given the same reference characters. The differences between Fig. 18 and Fig. 19 are three. One difference is that in Fig. 19, a chamber 182A has been substituted for the spring 182. The set point pressure $Ps$ is transmitted to the chamber 182A from a manually adjustable pressure regulator, which forms means for adjusting the set point. The diaphragm 181 is exposed to equal pressures on its opposite faces and therefore forms a one-to-one relay. Another difference is that a rate restriction $Rc1$ is located with its input connected to the junction between the output of restriction $Rb1$ and the input to restriction $Ra1$ and with its output connected to chamber 810. Restriction $Rc1$ supplies a further adjustable rate component to the pressure within chamber 810 in addition to the rate component supplied by the restrictions $Rb1$ and $Ra1$, which was explained above in connection with Fig. 18. The third difference is that Fig. 19 employs another rate restriction $Rc$. Restriction $Rc$ is connected between the output pressure $P_0$ and the negative feedback chamber of the four-chambered stack and does not effect the further advantageous rate function described in connection with Fig. 18.

Figure 20:
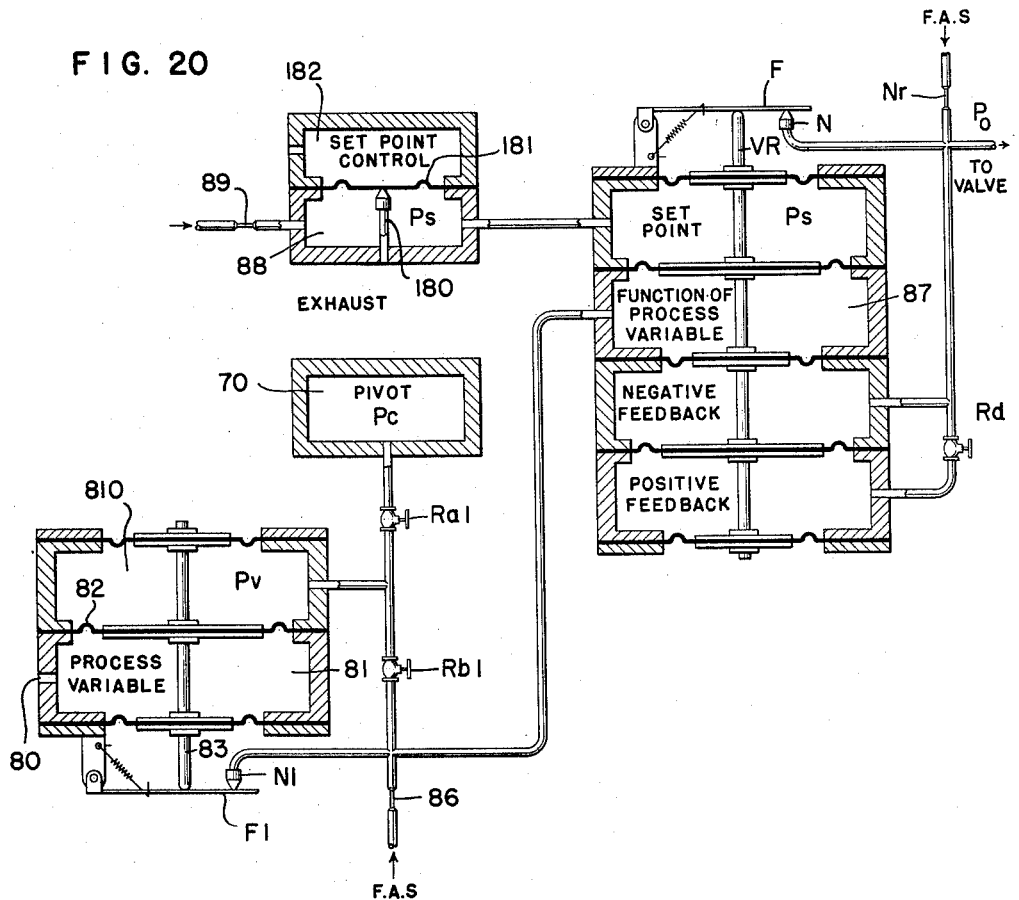

The modification of Fig. 20 has the same advantages as Figs. 18 and 19, accomplished in a different manner. This modification permits the process under control to be started and to come up to equilibrium or steady state as rapidly as possible without overshooting. These desirable results are accomplished in the device of Fig. 20 as follows. A pressure proportional to the process variable is fed through an inlet conduit 80 to chamber 81 where it acts on diaphragm 82 and moves rod 83 so as to cause flapper F1 to vary the pressure escaping through nozzle N1. Air is supplied from a source F.A.S. through a restriction 86 to nozzle N1, to the input side of a restriction $Rb1$, and to chamber 87 of a four-chambered stack. Chamber 87 thus receives a pressure equal to a function of the process variable. The output side of restriction $Rb1$ is connected to a chamber 810, which thus contains a pressure $Pv$ equal to the process variable pressure $Pv$. A restriction $Ra1$ is connected, on its input side, to the output of restriction $Rb1$ and to chamber 810 and, on its output side, to a chamber 70 having rigid walls and adapted to contain a variable pivot pressure PC. Pressure $Pc$ tends to become equal to the pressure at the input side of restriction $Rb1$.

The four-chambered stack contains a chamber adapted to receive a set point pressure $Ps$ from a set point adjustment having a diaphragm 181 controlling the pressure supplied from a source F.A.S. through a restriction 89 to a chamber 88. A nozzle 180 is controlled by diaphragm 181 to exhaust any excess of the set point pressure $Ps$ from chamber 88. A set point control pressure equivalent to the set point, or that value of the measured variable which it is desired to have the process maintain, is fed to the chamber 182 where it acts on the opposite side of diaphragm 181 from the set point pressure $Ps$.

The four-chambered stack has a valve rod VR adapted to be moved by the diaphragms acted on by the pressure proportional to a function of the measured variable and by the pressure equal to the set point. Valve rod VR causes flapper F to move relative to nozzle N and thus varies the pressure of a supply of air from a source F.A.S. through a restriction $Nr$. The pressure in nozzle N forms the output pressure $P_0$ which is fed in three directions. In one direction $P_0$ is fed to a second controller (not shown) or to the final control element (not shown). In another direction $P_0$ is fed to the negative feedback chamber of the four-chambered stack. In a third direction pressure $P_0$ is fed through a reset restriction $Rd$ to the positive feedback chamber of the four-chambered stack.

The operation of the modification of Fig. 20 is as follows. Assuming that the process under control is to be started up and that the controller has been standing idle for a considerable time and the process variable pressure in chamber 81 to be zero, the source F.A.S. supplies air to nozzles N and N1. On the output side of restriction 86, this supply pressure which is the pressure in nozzle N1, and in chambers 87, 810, and 70 is at a minimum of three pounds per square inch gauge (p.s.i.g.) because the flapper F1 has remained completely off the nozzle N1 for an extended period of time. Assuming a set point pressure $Ps$ of nine p.s.i.g. and a pressure in chamber 87 of three p.s.i.g. at the start, the pressure on the output side of restriction $Nr$ (which is the output pressure $P_0$, the pressure in nozzle N, and the pressures in the negative and positive feedback chambers of the four-chambered stack) is at a maximum of fifteen p.s.i.g. or a minimum of three p.s.i.g. depending upon whether the four-stack controller is arranged for direct operation, or, as shown, for reverse operation. Assume the process variable pressure $Pv$ to start at zero and to increase to three p.s.i.g., it is obvious that flapper F1 cannot be closed against nozzle N1 until the pressure in chamber 81 reaches three p.s.i.g. because the pressure in chamber 810 is already three p.s.i.g. When the pressures in chambers 81 and 810 become equal, flapper F1 closes against nozzle N1 and the pressure in chamber 87 begins to increase. Likewise, the pressures in chambers 810 and 70 begin to increase and limit the increase of the pressure in chamber 87. The action of the pressures within the chambers 81 and 810 is to maintain the pressure in chamber 810 substantially equal to the pressure in the chamber 81. Because of the resistance of the restriction R$b$1, the changes in the pressure in nozzle N1 and chamber 87 will be caused temporarily to exceed the changes in the pressures in chambers 81 and 810. Accordingly, when the process variable pressure P$v$ is in a state of change, the pressure in chamber 87 will be caused to undergo greater changes and the amount of the excess depends upon the rate at which the measured variable pressure undergoes change. Until the pressure in chamber 87 equals the pressure P$s$ in the set point chamber, the flapper F will be held on nozzle N and the output pressure P$_0$ will be at its maximum (fifteen p.s.i.g.). Therefore, the final control valve will be held in one position of its travel until the pressure in chamber 87 reaches the pressure P$s$. When the pressure in chamber 87 passes the pressure P$s$ in the set point chamber, which occurs at a time prior to the time that the process variable pressure P$v$ reaches the set point pressure, the flapper F will start to move away from the nozzle N and the output pressure P$_0$ correspondingly will start to reduce. By so doing, the consequent reduction in the output pressure P$_0$ will have been sufficiently reduced by the time that the measured variable pressure P$v$ reaches set point pressure P$s$ so as to avoid overshooting of the control process.

The above described effect of restriction R$b$1 is further accentuated by the action of restriction R$a$1 and the lagging pressure in chamber 70. It is thus seen that the throttling range adjusting means, including restrictions R$b$1, R$a$1, and pivot pressure chamber 70, have a beneficial effect in preventing over-shoot of the controlled process when starting up.

When the process variable pressure P$v$ becomes equal to the set point pressure P$s$ and remains equal thereto, the controller is said to be in a steady state, under such conditions, the pressures in chambers 87, 810, and 70 become equal to each other and to the set point pressure P$s$. When these conditions exist, if it is desired to change the throttling range, this can be done by varying the ratio of the resistances of restrictions R$b$1 and R$a$1, without changing the position of the final control element and therefore without upsetting the process under control.

Figure 21:
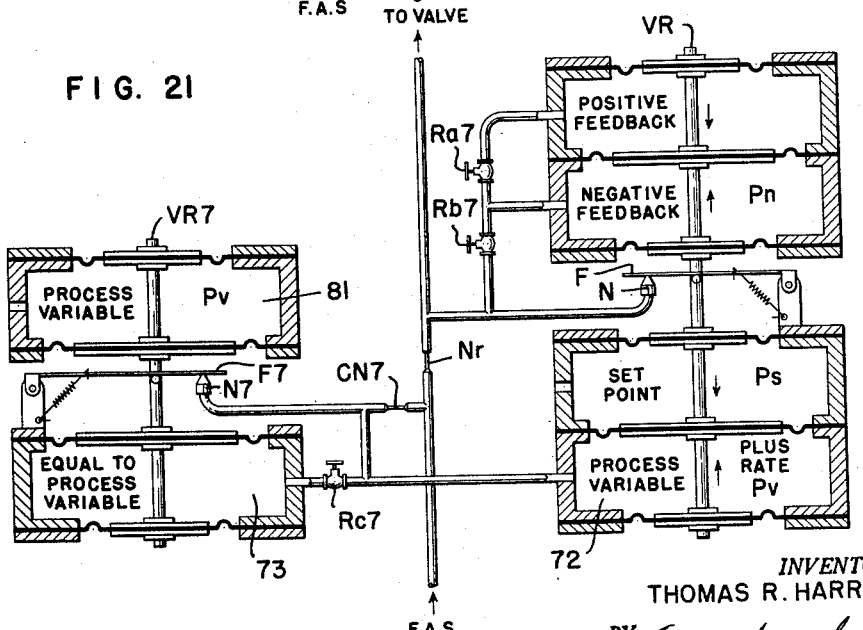

The modification of Fig. 21 shows on the right, a four-chamber stack which is a substantial duplicate of the four-chambered stack of Fig. 7. In Fig. 21 this four-chamber stack is in combination with chambers 81 and 73, flapper F7 and nozzle N7 together with restrictions CN7 and R$c$7 to add a rate component to the process variable to be fed into the chamber 72 responsive to variations in process variable. This addition of the rate component to the process variable functions to avoid overshoot in the process controlled during a start-up period in the same manner as described for Fig. 20.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. Means to change the proportional band of an elastic-fluid-pressure-actuated controller, said means including, valve means operable to vary a first elastic fluid pressure which pressure is different from atmospheric pressure, means to operate said valve means in response to a deviation in a measured variable, and conduits forming a pneumatic circuit, said conduits comprising, a motor responsive to variations in said first fluid pressure and mechanically connected to said valve means to operate it in the opposite sense to that in which it is moved in response to said deviation, a first restriction connected between said first fluid pressure and said motor, a second restriction connected at one end to the output of said first restriction and to said motor, and a normally closed chamber connected to the opposite end of said second restriction and containing a second elastic fluid pressure, one of said first and second fluid pressures tending to become equal to the other of said first and second fluid pressures.

2. A controller according to claim 1 in which said chamber forms part of a relay having an addditional source of fluid and an exhaust of fluid to atmosphere to vary the pressure of said second fluid.

3. A controller according to claim 2 in which said relay includes a wall movable to control the flow of fluid through one of said source and said exhaust.

4. A controller according to claim 1 having a third restriction connected between said motor and the output of said first restriction to give said controller a rate action mode of operation.

5. An elastic-fluid-pressure-actuated controller, including, a first closed chamber and a third closed chamber each having a movable wall acting in one direction, a second closed chamber and a fourth closed chamber each having a movable wall acting in the opposite direction, means responsive to the resultant of the actions of the pressures within each of said four chambers on the movable walls thereof to provide an output fluid pressure, a fifth closed chamber having a movable wall acting in said one direction, a first restriction having a resistance to fluid flow and connecting said output pressure to said fourth chamber, a second restriction having a resistance to fluid flow and connected between said fifth chamber and said fourth chamber, the sum of the resistance of said first restriction and the resistance of said second restriction providing means for determining the rate of change of positive feedback pressure and the proportion between said resistances providing means for determining the proportional band of the controller, means to apply to the movable wall of one of said second and third chambers a set point fluid pressure which is manually adjustable and independent of said output pressure and which provides a set point pressure, and means to apply to the movable wall of the other of said second and third chambers a measured variable fluid pressure which is variable in response to a deviation of a measured variable.

6. An elastic-fluid-pressure-actuated controller, including, a first closed chamber and a third closed chamber each having a movable wall acting in one direction, a second closed chamber and a fourth closed chamber each having a movable wall acting in the opposite direction, means responsive to the resultant of the actions of the pressures within each of said four chambers on the movable walls thereof to provide an output fluid pressure, a fifth closed chamber having a movable wall acting in said one direction, a first restriction having a resistance to fluid flow and connecting said output pressure to said fourth chamber, a second restriction having a resistance to fluid flow and connected between said fifth chamber and said fourth chamber, the sum of the resistance of said first restriction and the resistance of said second restriction providing means for determining the rate of change of positive feedback pressure and the proportion between said resistances providing means for determining the proportional band of the controller, means to apply to the movable wall thereof one of said second and third chambers a set point fluid pressure which is manually adjustable and independent of said output pressure and which provides a set point pressure, means to apply to the movable wall of the other of said second and third chambers a measured variable fluid pressure which is variable in response to a deviation of a measured variable, and a restriction connected between said fourth chamber and said first chamber to assist in determining the reset mode of operation of said controller.

7. An elastic-fluid-pressure-actuated controller, including a first closed chamber and a third closed chamber each having a movable wall acting in one direction, a second closed chamber and a fourth closed chamber each having a movable wall acting in the opposite direction, means responsive to the resultant of the actions of the pressures within each of said four chambers on the movable walls thereof to provide an output fluid pressure, a fifth chamber having a movable wall and having a supply of fluid thereto and an exhaust of fluid therefrom controlled by the pressure in said first chamber, a first restriction having a resistance to fluid flow and connecting said output pressure to said fourth chamber, a second restriction having a resistance to fluid flow and connected between said fifth chamber and said fourth chamber, the sum of the resistance of said first restriction and the resistance of said second restriction providing means for determining the rate of change of positive feedback pressure and the proportion between said resistances providing means for determining the proportional band of the controller, means to apply to one of said second and third chambers a fluid pressure which is manually adjustable and independent of said output pressure and which provides a set point pressure, means to apply to the other of said second and third chambers a fluid pressure which is variable in response to a deviation of a measured variable, and a reset restriction connected at one end to the input end of said first restriction and to said output pressure and connected at its other end to said first chamber to delay the application of changes in said output pressure to said first chamber and thereby give said controller a reset mode of operation.

8. A controller according to claim 7 in which the pressure within said first chamber acts directly on said means responsive to the resultant.

9. An elastic-fluid-pressure-actuated controller, including, a first closed chamber and a third closed chamber each having a movable wall acting in one direction, a second closed chamber and a fourth closed chamber each having a movable wall acting in the opposite direction, means responsive to the resultant of the actions of the pressure within each of said four chambers on the movable walls thereof to provide an output fluid pressure, a fifth chamber having a movable wall acting in said one direction and having a supply of fluid thereto and an exhaust of fluid therefrom controlled by the pressure in said first chamber, a first restriction connecting said output pressure to said fourth chamber to delay the application of changes in said output pressure to said fourth chamber, a second restriction connected between said first chamber and said fifth chamber to delay the equalization of the pressures in said first chamber and said fifth chamber, a rate restriction connected between the output of said first restriction and said fourth chamber to give said controller a rate mode of operation, and a reset restriction connected between said output pressure and said first chamber to give said controller a reset mode of operation.

10. An elastic-fluid-pressure-actuated controller, including, a first closed chamber and a third closed chamber each having a movable wall acting in one direction, a second closed chamber and a fourth closed chamber each having a movable wall acting in the opposite direction, means responsive to the resultant of the actions of the pressure within each of said four chambers on the movable walls thereof to provide an output fluid pressure, a fifth chamber having a movable wall acting in said one direction and having a supply of fluid thereto and an exhaust of fluid therefrom controlled by the pressure in said first chamber, a first restriction connecting said output pressure to said fourth chamber to delay the application of changes in said output pressure to said fourth chamber, a second restriction connected between said fourth chamber and said fifth chamber to delay the equalization of the pressures in said fourth chamber and said fifth chamber, a rate restriction connected between the output of said first restriction and said fourth chamber to give said controller a rate mode of operation, and a reset restriction connected between the output of said first restriction and said fifth chamber to give said controller a reset mode of operation.

11. Means adjustable to vary the proportional band of an elastic-fluid-pressure-actuated controller, said means including, a controller having a rigid casing divided into four closed chambers by flexible diaphragms each forming a movable wall of at least one of said chambers, means to apply to one of said chambers constituting a set point pressure chamber a fluid pressure which is manually adjustable, means applying to another of said chambers which constitutes a process variable chamber a fluid pressure which is variable in response to the deviation of a measured variable, the movable walls of said set point chamber and of said process variable chamber acting in opposite directions, a negative feedback chamber having a movable wall acting in opposition to said process variable chamber, and a positive feedback chamber having a movable wall acting in opposition to said set point chamber, means responsive to the resultant of the actions of the pressures within each of said four chambers on the movable sides thereof and constituting the sole means to provide an output fluid pressure, a first restriction having a resistance to fluid flow and connected at its inlet to said output pressure and connected at its outlet to said negative feedback chamber, and a second restriction having a resistance to fluid flow and connected at its outlet to said positive feedback chamber and connected at its inlet to said negative feedback chamber, the sum of the resistance of said first restriction and the resistance of said second restriction providing means for determining the rate of change of positive feedback pressure and the proportion between said resistances providing means for determining the proportional band of the controller.

12. Means adjustable to vary the proportional band of an elastic-fluid-pressure-actuated controller, said means including, a controller having a rigid casing divided into five closed chambers by flexible diaphragms each forming a movable wall of at least one of said chambers, means to apply to the movable wall of one of said chambers constituting a set point pressure chamber a fluid pressure which is manually adjustable, means to apply to the movable wall of another of said chambers constituting a process variable chamber a fluid pressure which is variable in response to a deviation of a measured variable, the movable walls of said set point chamber and of said process variable chamber acting in opposite directions, a negative feedback chamber having a movable wall acting in opposition to the movable wall of said process variable chamber, and a relay comprising a control pressure chamber, a chamber containing an additional source of fluid and an exhaust of fluid to atmosphere to vary the pressure of said additional fluid, and a movable wall separating said chambers and responsive to the pressure in each of said chambers, the movable wall of said control pressure chamber and the movable wall of said chamber containing said additional source of fluid acting in opposition to the movable wall of said set point chamber, a valve responsive to the resultant of the actions of the pressures within each of said five chambers on the movable walls thereof to provide an output fluid pressure, a first restriction having a resistance to fluid flow and connected at its inlet to said output fluid pressure and connected at its outlet to said negative feedback chamber and a second restriction having a resistance to fluid flow and connected at its inlet to said negative feedback chamber and to the outlet of said first restriction, and connected at its outlet to said one of the chambers of said relay containing said additional source of fluid, the sum of the resistance of the first restriction and the resistance of said second restriction providing means for determining the rate of change of positive feedback pressure and the proportion between said resistances providing means for determining the proportional band of the controller.

13. Means adjustable to change the proportional band of an elastic-fluid-pressure-actuated controller, said means including, valve means operably in response to a deviation in a measured variable so as to vary a first elastic fluid pressure which pressure is different from atmospheric pressure, and conduits forming a pneumatic circuit, said conduits comprising, a motor responsive to variations in said first fluid pressure and mechanically connected to said valve means to operate it in the opposite sense to that which is moved by said deviation, a first restriction connected between said first fluid pressure and said motor, a second restriction connected at one end to the output of said first restriction and to said motor, a chamber connected to the opposite end of said second restriction and containing a second fluid pressure, one of said fluid first and second pressures tending to become equal to the other of said first and second fluid pressures, and means to apply to said valve means a set point fluid pressure which is manually adjustable and independent of said first and of said second fluid pressures and which biases said valve means in the opposite sense to that in which it is biased by said measured variable and which provides a value from which said deviation is measured.

References Cited in the file of this patent

UNITED STATES PATENTS

| | | |
|---|---|---|
| 2,512,561 | Ziegler | June 20, 1950 |
| 2,517,051 | Swenson | Aug. 1, 1950 |
| 2,543,120 | McLeod et al. | Feb. 27, 1951 |
| 2,633,858 | Eckman | Apr. 7, 1953 |
| 2,638,911 | Griswold et al. | May 19, 1953 |
| 2,712,321 | Grogan | July 5, 1955 |
| 2,737,964 | Olah | Mar. 13, 1956 |
| 2,776,670 | Hunt | Jan. 8, 1957 |